United States Patent [19]

Martin

[11] Patent Number: 5,094,527
[45] Date of Patent: Mar. 10, 1992

[54] TEMPERATURE COMPENSATED STRAIN SENSOR FOR COMPOSITE STRUCTURES

[75] Inventor: David A. Martin, Northridge, Calif.

[73] Assignee: Lockheed Corporation, Calabasas, Calif.

[21] Appl. No.: 533,032

[22] Filed: May 14, 1990

[51] Int. Cl.⁵ .............................................. G01B 11/16
[52] U.S. Cl. ................................................... 356/32
[58] Field of Search ......................... 73/655, 705, 800; 356/32-35.5; 250/227.14-227.19; 340/535

[56] References Cited

U.S. PATENT DOCUMENTS

| | | | |
|---|---|---|---|
| 3,910,105 | 10/1975 | Hoffstedt | 73/88 |
| 4,163,397 | 8/1979 | Harmer | 73/800 |
| 4,697,876 | 10/1987 | Dyott | 250/227.19 |
| 4,836,030 | 6/1989 | Martin | 73/800 |
| 4,932,262 | 6/1990 | Wlodarczyk | 73/708 |

OTHER PUBLICATIONS

Journal of Composites Technology & Research, vol. 10, Nov. 88, "A Rugged Optical Fiber Interferometer for Strain Measurements Inside a Composite Material Laminate" by Murpay et al.
OFC Conference (San Francisco), Jan. 90, "Fiber Optic Sensors Using High Resolution Optical Time Domain Instrumentation Systems" by B. Zimmermann.
Laser Sensors IV, SPIE 718, 1987, "Embedded Optical Fiber Strain Sensor for Composite Structure Applications" by W. J. Rowe et al.

*Primary Examiner*—Robert Raevis
*Attorney, Agent, or Firm*—Louis L. Dachs

[57] ABSTRACT

A temperature compensated strain sensor for measuring the strain at specific locations within a molded composite structure and the like, is disclosed. In detail, the invention comprises a hollow tubular member mounted within the structure which has first and second ends extending out thereof and passing in proximity to each specific location at with strain is to be measured. A first optical fiber is mounted within the hollow tubular member and has first and second ends exiting the first and second ends, respectively, of the hollow tubular member. A plurality of second optical fibers, equal to the number of specific locations at which strain is to be measured, are mounted within the hollow tubular member and have first and second ends exiting the first and second ends, respectively, thereof. One each of the second optical fibers exits the hollow tubular member and extends across and is bonded to the resin of the structure at the specific location and thereafter re-enters the hollow tubular member.

3 Claims, 2 Drawing Sheets

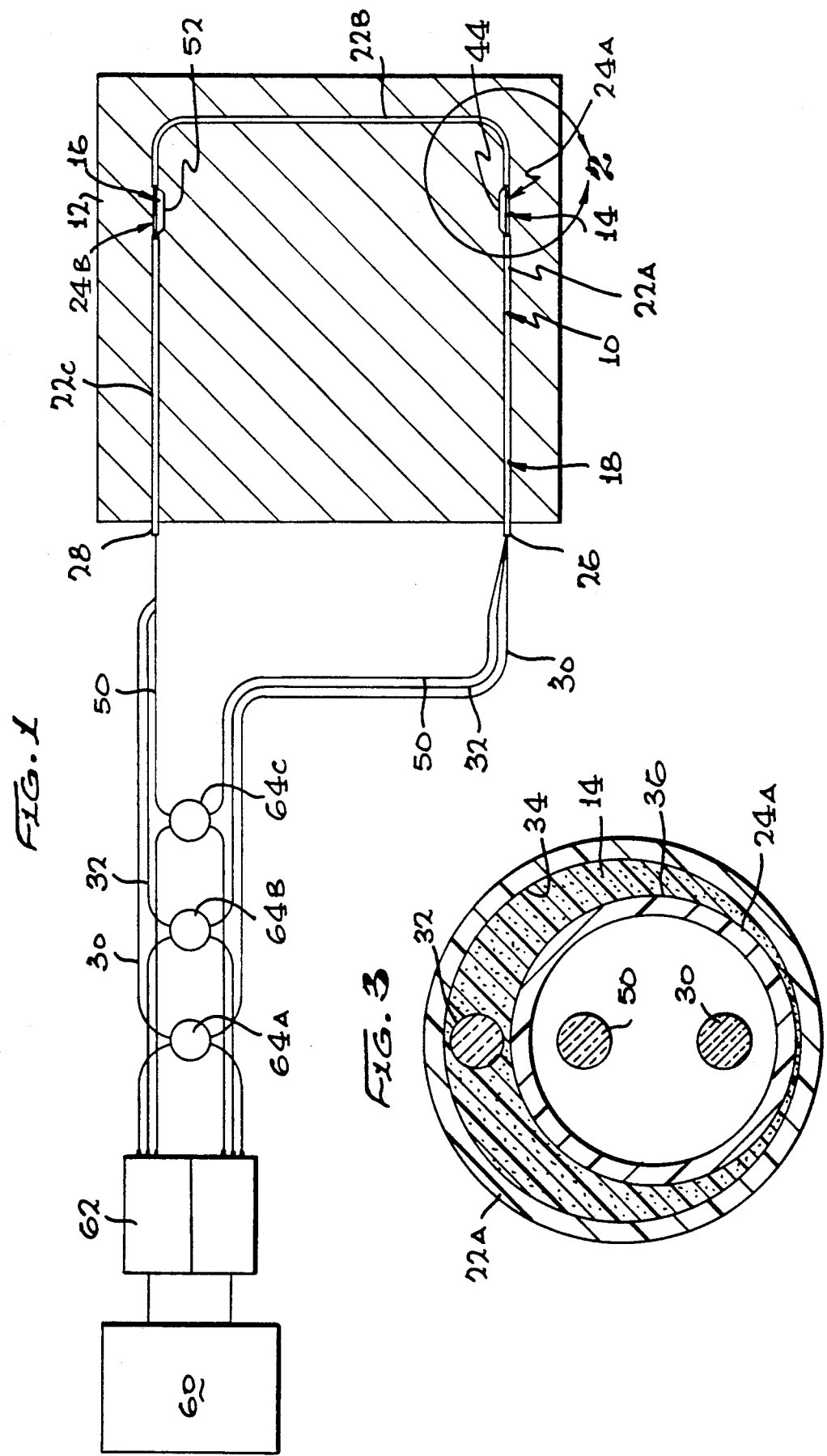

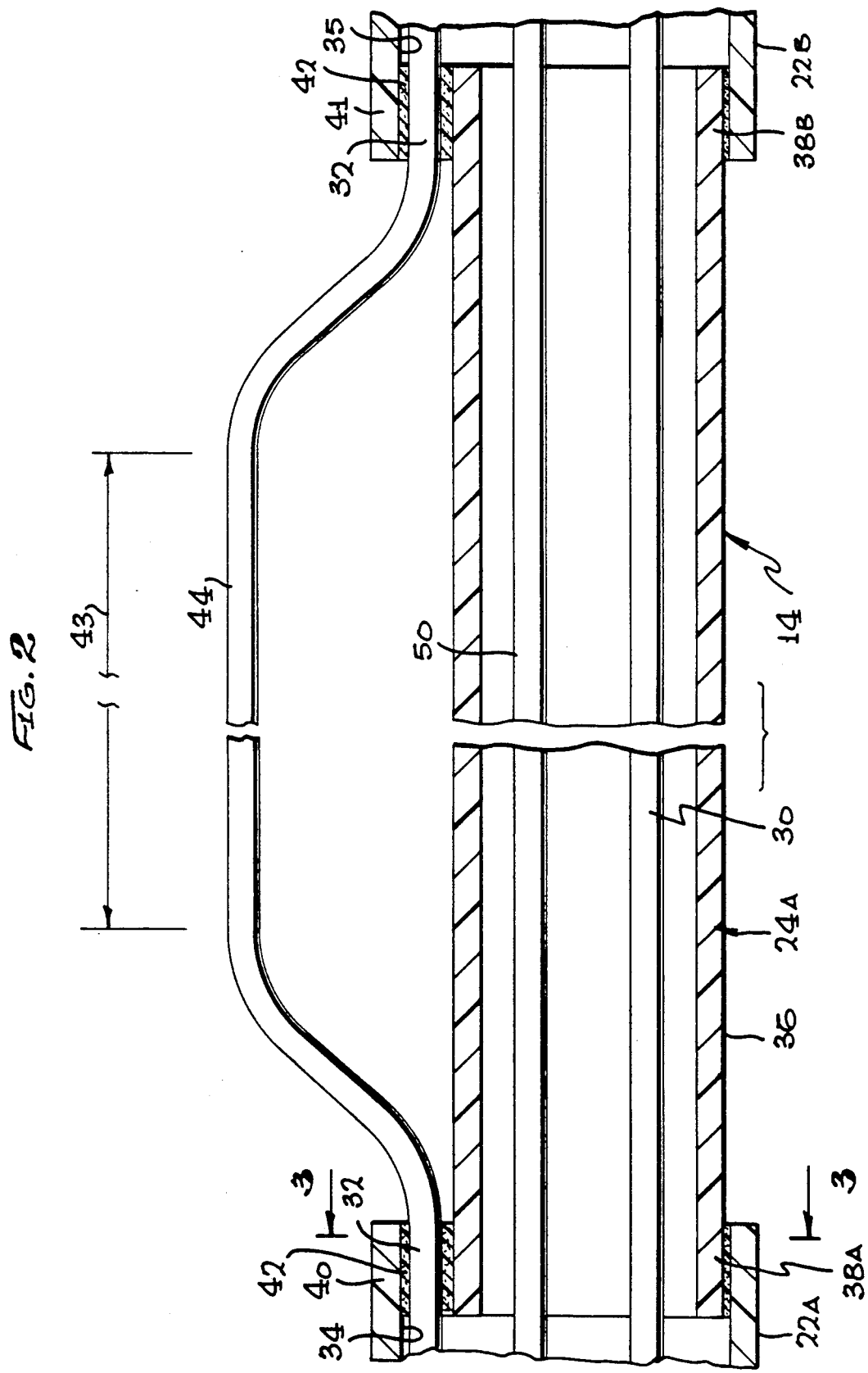

TEMPERATURE COMPENSATED STRAIN SENSOR FOR COMPOSITE STRUCTURES

BACKGROUND OF THE INVENTION

1. Technical Field

The invention relates to the field of strain sensors and, in particular, to temperature compensated strain sensors making use of optical fiber technology suitable for embedding in molded articles such as composite structures.

2. Background Art

Composite parts are generally composed of filamentary material in a resin matrix. The filamentary material is either woven or unidirectional and the orientation thereof is dictated by design considerations. The part is typically made by laying up individual sheets of pre-impregnated filamentary material in a mold. The lay up is vacuum bagged and a vacuum is drawn from between the bag and mold and the whole assembly is placed in an autoclave or heated press. Thereafter, the temperature and pressure are raised to mold the part. If the resin is a thermoplastic type, it is typically heated to a point where the resin melts and flows to form the homogenous matrix and if it is a thermoset type resin it is heated to a temperature wherein it melts and cures.

The embedding of optical fibers in composite structures to measure strain is not new. For example, U.S. Pat. No. 3,910,105 "Method for Detection Of Flaws In Composite Fiberglass Structures" by D. J. Hoffstedt discloses a method of embedding optical fibers in a composite structure such as a rotor blade for a helicopter. Numerous optical fibers are placed in the structure during fabrication such that the ends exit thereof. If during normal flight operations the rotor blade is overstressed or becomes fatigue damaged, one or more of the optical fibers will be damaged or even severed. The damage is easily detected by ducting a light beam through the fibers, for the light will be attenuated if the fiber is cracked or broken. However, this invention only really indicates a strain level that has caused damage and is incapable of providing a quantitative value of the strain level at any particular time.

Applicant's invention, U.S. Pat. No. 4,836,030 "Method Of Testing Composite Materials For Structural Damage" provides an improved method of embedding the optical fibers. In this method the optical fibers are first embedded in a layer of resin prior to the lay up of the structure. Thus, when the actual lay up of the structure was undertaken, the optical fibers being already positioned in the resin sheet, are automatically positioned in the lay up upon installation of the resin sheet. However, there was still no capability to measure strain levels below a level that caused damage.

Several fiber optic sensing techniques have been devised which can detect optical signal changes resulting from strain imposed anywhere along the length of an imbedded optical fiber. For example, a high resolution optical time domain sensing technique has been disclosed by B. Zimmermann et al. in an article entitled, "Fiber Optic Sensors Using High Resolution Optical Time Domain Instrumentation Systems" OFC Conference (San Francisco) January 1990. In the Zimmermann article a high resolution optical time domain reflectometer (OTDR) is used in a transmissive mode and utilizes a re-entrant loop coupler to further increase resolution of very small changes in fiber length to enable embedded fiber strain measurement. A light pulse is injected by a coupler into a loop of optical fibers to recirculate repeatedly through the loop. Each time the pulse passes the coupler, a small portion of the pulse is diverted to a detector which has measured elapsed time since injection of the original light pulse. The detector records the resultant string of small portions of the original pulse, all measured in the time domain, which (according to the speed of light in glass fiber) can be converted to a length measurement of the fiber loop multiplied by the number of detectable pulse portions. Using this method the increase or decrease in length (strain) of the embedded fiber can be effectively measured which can be used to calculate the stress and ultimately the load. In practical applications however, different strains can be imposed at two or more sites distributed anywhere along the fiber length. Such distributed sensing techniques can provide only one value, which represents the average of total strain effect all along the entire length of the fiber. In most cases, such a value is not very useful, since localized strain at specific locations is needed to determine critical strain loads. Furthermore, a change in temperature will also cause a change in the length of the optical fiber which will, in turn, cause the OTDR to give an inaccurate strain measurement. Up until the present invention there was no efficient way for measuring the strain by use of distributed optical fiber type sensors at a number of locations within a composite structure while simultaneously compensating for temperature.

In the following articles entitled, "Embedded Optical Fiber Strain Sensor for Composite Structure Applications", Fiber Optic and Laser Sensors IV, SPIE 718, 1987, by W. J. Rowe et al., and "A Rugged Optical Fiber Interferometer for Strain Measurements Inside a Composite Materials Laminate" by K. Murphy et al., and also in the previously mentioned article by B. Zimmermann, all three articles disclose distributed methods of sensing strain.

Thus, it is a primary object of the subject invention to provide a temperature compensated strain sensor.

It is another primary object of the subject invention to provide a temperature compensated strain sensor using distributed optical fiber technology.

It is another primary object of the subject invention to provide a temperature compensated strain sensor that can be embedded into a composite structure during the forming thereof.

It is a further object of the invention to provide a temperature compensated strain sensor that can be embedded within a composite structure that does not significantly effect the strength of the structure.

SUMMARY OF THE INVENTION

The invention is a temperature compensated strain sensor primarily adapted for use in molded articles, such as composite structures and the like, to measure the internal strain at numerous specific locations therein. In detail, the invention comprises a hollow tubular member having first and second ends. The tubular member is adapted to be molded into the composite structure with the first and second ends extending out therefrom and passing in proximity to the various specific locations within the structure where the strain is to be monitored. A first optical fiber is mounted within the tubular member having ends exiting the first and second ends thereof. A plurality of second optical fibers, equal to the number of specific locations within the structure where strain is to be measured, are mounted within the tubular member, also having ends exiting thereof. One of the second optical fibers exits the tubular member and returns thereto at each specific location along the tubular member where strain is to be measured such that when the tubular member is installed within the structure the second optical fiber exits and returns to the tubular member in proximity to and extends across each specific location within the structure. Thus, the first optical fiber is unrestrained within the tubular member and can be used to measure temperature changes.

The plurality of second optical fibers are restrained within the resin matrix across the specific locations when the tubular member is molded within the structure and will be subjected to elongation or retraction when the structure is stressed. However, these second optical fibers will also extend or retract in length due to temperature changes. The sensor is installed in the composite structure during the forming process thereof in a manner similar to the installation of individual optical fibers as set forth in the previously mentioned patents to Hoffstedt and Martin herein incorporated by reference.

The ends of the first optical fiber and each second optical fiber are joined to optical couplers the outputs of which are joined to a dual head optical switch. The outputs of the optical switch are in turn coupled to an OTDR. Thus, any changes in length of the optical fibers can be measured. Since the first optical fiber is only sensing temperature and the second optical fibers are sensing both temperature and strain, it is a simple matter to subtract that portion of the signal due to temperature changes from any signal from the second optical fiber, leaving only a signal proportional to the strain.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a semi-schematic view of a simple composite part incorporating the subject temperature compensated strain sensor.

Illustrated in FIG. 2 is an enlarged view of a portion of the strain sensor shown in FIG. 1 encircled by the arrow 2.

Illustrated in FIG. 3 is a cross-sectional view of FIG. 2 taken along the line 3—3.

DESCRIPTION OF PREFERRED EMBODIMENT

Referring to FIGS. 1, 2 and 3, it can be seen that the subject temperature compensated strain sensor, generally indicated by numeral 10, is shown molded into a composite part 12. As illustrated there are two sites within part 12 that are to have the strain measured, indicated by numerals 14 and 16. However, it should be understood that there could be only one or many more than two. The sensor 10 includes a hollow capillary tube assembly, indicated by numeral 18, which is made up of three large diameter tube sections 22A, 22B and 22C joined together by smaller diameter tube sections 24A and 24B in a manner to be subsequently discussed. The ends 26 and 28 of the large diameter tube sections 22A and 22C extend out of the part 12. A first optical fiber 30 is mounted within the tube assembly 18 and extends out of ends 26 and 28 of the tube sections 22A and 22C, respectively.

A second optical fiber 32 is also mounted within the tube assembly 18 extending out ends 26 and 28; however, this optical fiber 32 also exits and returns from the tube assembly 18 at the site 14. Particularly referring to FIGS. 2 and 3 it can be seen that the tube sections 22A and 22B have inside walls 34 and 35, respectively, having diameters larger than the outside wall 36 of the tube section 24A. Thus, the ends 38A and 38B of the tube section 24A fit within the ends 40 and 41 of the tube sections 22A and 22B, respectively. The optical fiber 32 exits from end 40 between the inside wall 34 of the tube section 22A and the outside wall 36 of the tube section 24A and returns into end 41 between inside wall 35 of the tube section 22B and the outside wall 36 of the tube section 24A. An adhesive 42 is injected about the ends 38A and 38B of the tube section 24A and optical fiber 32 sealing off the interior of sections 22A and 22B. The length 43 of the exposed portion 44 of the optical fiber 32 should be as long as possible; however, lengths in the 5 to 6 inch range produce excellent strain measurement results. A third optical fiber 50 is also installed within the sensor assembly 10 and is used to measure strain at the second site 16 and exits tube section 22B and returns to tube section 22C in an identical manner thus, having an exposed portion 52 (best seen in FIG. 1). Tube section 24B is joined to tubes 22A and 22C and sealed in a manner similar to the tube section 24A.

Thus, it can be seen that when the sensor assembly 10 is molded into the part 12 the exposed portions 44 and 52 of optical fibers 32 and 50, respectively, will be bonded into the resin matrix of the part. Therefore, any loads applied to the part 12 will cause strain to be induced which will be sensed by the exposed portions 44 and 52 of the optical fibers 32 and 50. Of course, any temperature changes will also cause the exposed and unexposed portions to change length. However, the optical fiber 30, whose length is only affected by temperature, provides a signal proportional thereto. As previously mentioned, the methods of installing a single optical fiber as set forth in patents to the Hoffstedt and Martin can be used to install the optical fiber assembly.

A typical strain sensor 10 would be made of the following:

| PART | OUTSIDE DIAMETER | INSIDE DIAMETER |
|---|---|---|
| Tube Sections 22A, 22B and 22C | 850 microns | 700 microns |
| Tube Sections 24A and 24B | 400 microns | 350 microns |
| Optical Fibers 30, 32 and 50 | 110 microns | |

Thus, the sensor assembly 10 is quite small in overall diameter and has little or no affect on the strength of the part 12. A suitable material for the tube sections 22A, 22B and 22C, and 24A and 24B is Silica glass capillary tubes which can be obtained from Polymicro Technology, Inc. Phoenix, Ariz. A suitable adhesive 42 is No. H77 manufactured by the Epoxy Technology, Inc., Bellerica, Mass.

Referring to FIG. 1 it can be seen that all three optical fibers 30, 32 and 50 are coupled to a Laser OTDR 60 via a dual head optical switch 62 and optical couplers 64A, 64B and 64C allowing the length of each to be very accurately determined. The optical fibers 30, 32 and 50, the OTDR 60, optical switch 62 and optical couplers 64A, 64B and 64C can also be obtained from numerous manufacturers. For example, a suitable OTDR is a PICO-SECOND OTDR manufactured by OPTO-Electronics, Inc., Oakville, Ontario, Canada, a suitable coupler is Model No. F03666 which can be obtained from Litton Poly Scientific, Inc., Blacksburg, Va., and a dual head switch is Model No. SW16, obtained from J.D.S. Optic, Inc., Ottawa, Ontario, Canada.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to optical sensor industry and to composite structures manufacturers.

I claim:

1. A temperature compensated strain sensor for measuring the strain at specific locations within a molded composite structure, comprising:
    a hollow tubular member mounted within the structure and having first and second ends extending out thereof and passing in proximity to each specific location at which strain is to be measured;
    a temperature sensitive optical fiber mounted within said hollow tubular member and having first and second ends exiting said first and second ends, respectively, of said hollow tubular member; and
    strain and temperature sensitive optical fibers equal to the number of specific locations at which strain is to be measured, said strain and temperature sensitive optical fibers mounted within said hollow tubular member and having first and second ends exiting said first and second ends of said hollow tubular member, respectively, thereof, one each of said strain and temperature measuring optical fibers exiting said hollow tubular member and extending across and bonded to the resin of the structure at the specific location and thereafter re-entering said hollow tubular member.

2. The sensor as set for in claim 1 wherein:
    said hollow tubular member comprises alternating first and second hollow tubular sections joined together, said second sections located in the proximity to the specific locations, said second sections having a diameter less than the diameter of said first sections and further having ends in an overlapping relationship with adjacent ends of said first sections;
    said one each of said strain and temperature sensitive fibers exiting and returning to said hollow tubular member between the overlapping portions of first and second hollow tubular sections; and
    said overlapping portions of said first and second tubular sections sealed to each other by an adhesive.

3. The sensor as set forth in claim 2 wherein said sensor further comprises means to sense the change in length in said temperature measuring and said strain and temperature sensitive optical fibers.

* * * * *